US012715002B2

(12) United States Patent
Henderson

(10) Patent No.: US 12,715,002 B2
(45) Date of Patent: Aug. 25, 2026

(54) SHREDDING MACHINE

(71) Applicant: Leitz ACCO Brands GmbH & Co KG, Stuttgart (DE)

(72) Inventor: James Matthew Henderson, Dorset (GB)

(73) Assignee: Leitz ACCO Brands GmbH & Co KG, Stuttgart (DE)

( * ) Notice: Subject to any disclaimer, the term of this patent is extended or adjusted under 35 U.S.C. 154(b) by 0 days.

(21) Appl. No.: 19/074,011

(22) Filed: Mar. 7, 2025

(65) Prior Publication Data

US 2025/0289002 A1 Sep. 18, 2025

Related U.S. Application Data

(60) Provisional application No. 63/564,404, filed on Mar. 12, 2024.

(51) Int. Cl.
*B02C 18/00* (2006.01)

(52) U.S. Cl.
CPC .. *B02C 18/0007* (2013.01); *B02C 2018/0038* (2013.01); *B02C 2018/0046* (2013.01)

(58) Field of Classification Search
CPC .................... B02C 2018/0046; B02C 18/0007
See application file for complete search history.

(56) References Cited

U.S. PATENT DOCUMENTS

| | | | |
|---|---|---|---|
| 7,469,849 | B1 | 12/2008 | Lo |
| 7,624,938 | B2 | 12/2009 | Aries et al. |
| 7,661,613 | B1 | 2/2010 | Pan |
| 8,028,942 | B2 | 10/2011 | Matlin et al. |
| 8,162,244 | B2 | 4/2012 | Aries et al. |
| 8,336,794 | B2 | 12/2012 | Aries et al. |
| 8,496,197 | B2 | 7/2013 | Aries et al. |
| 8,672,251 | B2 | 3/2014 | Aries et al. |
| 8,888,030 | B2 | 11/2014 | Zhang |

(Continued)

FOREIGN PATENT DOCUMENTS

| | | |
|---|---|---|
| CN | 202096997 U | 1/2012 |
| CN | 210411045 U | 4/2020 |

(Continued)

OTHER PUBLICATIONS

International Search Report and Written Opinion for Application No. PCT/GB2025/050491 dated Jun. 10, 2025 (15 pages).

*Primary Examiner* — Matthew Katcoff
(74) *Attorney, Agent, or Firm* — Michael Best & Friedrich LLP

(57) ABSTRACT

A shredding machine includes an outer housing including a main portion and a door. The outer housing defines an interior space. A shredding engine positioned above the interior space includes a shredding motor and a plurality of interleaved cutters. A material passage is configured to receive material to be shredded and direct the material to be shredded to the plurality of interleaved cutters. A collection bin is constructed of transparent material and removably received inside the interior space, the collection bin being open at a top end and defining a central vertical axis. An interior lighting element is operable to emit light in the visible spectrum into the collection bin. During operation of the shredding engine, the collection bin is configured to rotate within the outer housing about the central vertical axis and the interior lighting element is energized to illuminate shredded material as it falls into the collection bin.

20 Claims, 12 Drawing Sheets

(56) References Cited

U.S. PATENT DOCUMENTS

| | | | |
|---|---|---|---|
| 9,016,606 | B1 | 4/2015 | Aries et al. |
| 9,088,183 | B2 | 7/2015 | Li et al. |
| 9,475,061 | B2 | 10/2016 | Aries et al. |
| 9,553,492 | B2 | 1/2017 | Xu |
| 9,669,410 | B2 | 6/2017 | Aries et al. |
| 9,802,202 | B2 | 10/2017 | Aries et al. |
| 10,576,476 | B2 | 3/2020 | Aries et al. |
| 2010/0181400 | A1 | 7/2010 | Davis et al. |

FOREIGN PATENT DOCUMENTS

| | | | |
|---|---|---|---|
| CN | 219252840 | U | 6/2023 |
| KR | 102749423 | B1 | 1/2025 |
| WO | 2005096742 | A2 | 10/2005 |

SHREDDING MACHINE

CROSS-REFERENCE TO RELATED APPLICATIONS

This application claims priority to U.S. Provisional Patent Application No. 63/564,404, filed on Mar. 12, 2024, the entire contents of which are incorporated by reference herein.

BACKGROUND

The present disclosure relates generally to a shredding machine used, for example, in a home or office to destroy paper printed with personal and/or confidential information.

SUMMARY

In one aspect, the invention provides a shredding machine including an outer housing including a main portion and a door movably coupled to the main portion. The outer housing defines an interior space. A shredding engine includes a shredding motor and a plurality of interleaved cutters, the shredding engine positioned above the interior space. A material passage is configured to receive material to be shredded and direct the material to be shredded to the plurality of interleaved cutters. A collection bin is constructed of transparent material and removably received inside the interior space, the collection bin being open at a top end and defining a central vertical axis. An interior lighting element is operable to emit light in the visible spectrum into the collection bin. During operation of the shredding engine, the collection bin is configured to rotate within the outer housing about the central vertical axis and the interior lighting element is energized to illuminate shredded material as it falls into the collection bin.

In another aspect, the invention provides a method of operating a shredding machine. A collection bin is supported within an interior space of an outer housing such that an open top end of the collection bin is situated underneath a plurality of interleaved cutters of a shredding engine of the shredding machine to receive shredded material therefrom. The collection bin is displayed through a transparent window of a closed door that selectively opens to allow access to the interior space and the collection bin. The shredding engine is operated by energizing a motor to drive the plurality of interleaved cutters, and material to be shredded is supplied to the plurality of interleaved cutters through a material passage. The material to be shredded is converted into the shredded material by the operation of the shredding engine. The collection bin is rotated about a central vertical axis during the operation of the shredding engine to evenly disburse the shredded material across a cross-sectional area of the collection bin. The shredded material is illuminated as it falls into the collection bin with a lighting element inside the outer housing during the operation of the shredding engine.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting.

FIGS. 1-14 illustrate a shredding machine 100 (or simply “shredder”) according to one construction of the present disclosure. The shredder 100 is operable to receive material (e.g., paper sheets among other things) to be shredded, shred the material into small pieces to enhance disposal security of information contained in the material, and temporarily store the shredded material. Such machines are well-known in the art, including for home use and that in commercial offices. The shredder 100 can have a variety of specifications, depending on the desire of the manufacturer. In some constructions, the shredder 100 meets P4 or P5 security level (i.e., P4: cross-cut: ≤160 $mm^2$ particles with width≤6 mm, P-5: cross-cut: ≤30 $mm^2$ particles with width≤2 mm). However, the shredder 100 can be adapted to meet various security levels while incorporating some or all aspects of the claims of the present disclosure.

Figure 9:
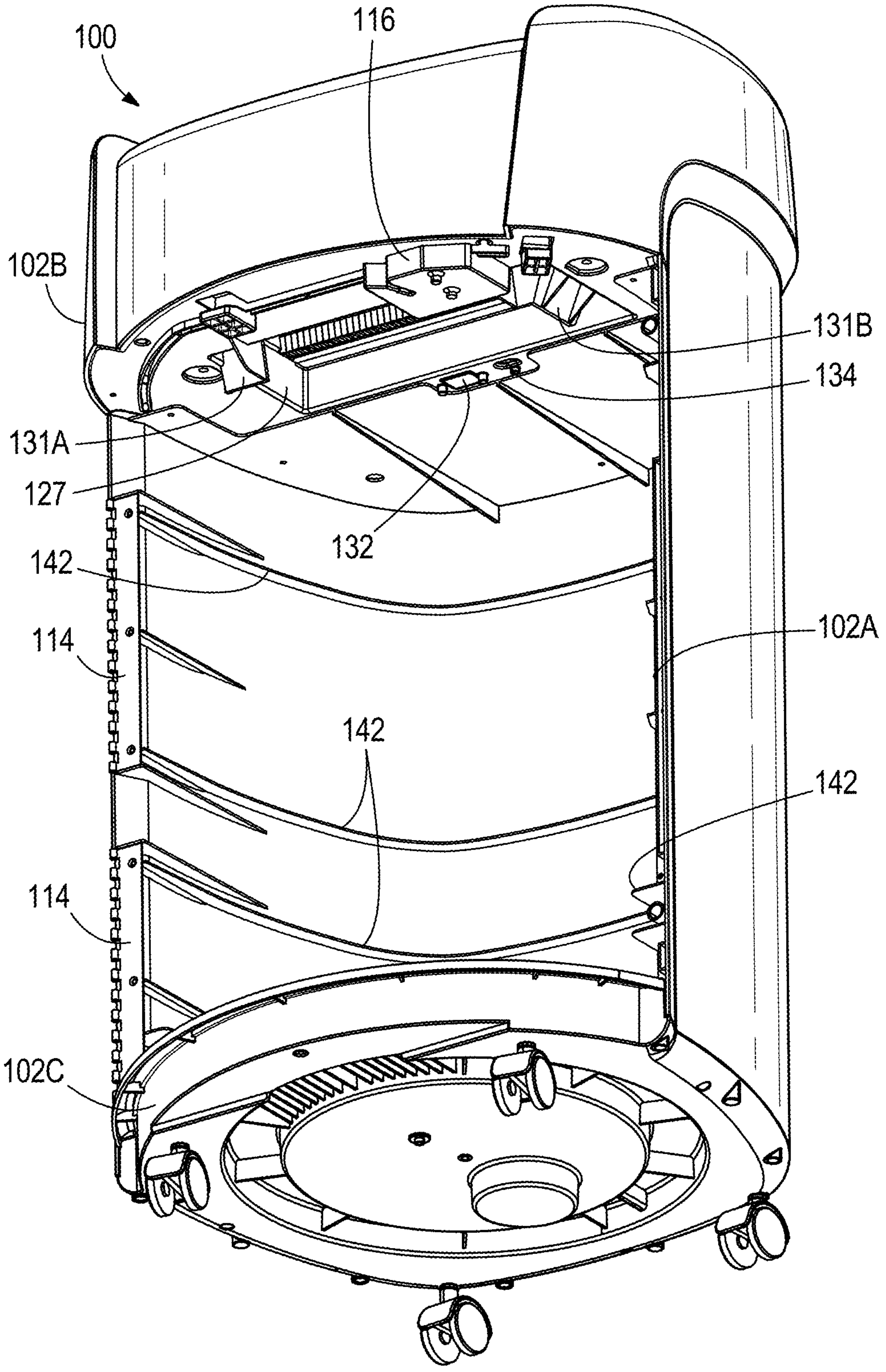
FIG. 9 is a bottom perspective view of the shredding machine of FIG. 1, showing the door and the collection bin removed.

The shredder 100 includes an outer housing 102 including a main portion 102A and a door 104 movably coupled to the main portion 102A. The outer housing 102 can be formed from one or more separate components secured together to define an interior space for a collection bin 106. For example, the outer housing 102 can include an upper portion 102B secured to the top of the main portion 102A and a lower or base portion 102C secured to the bottom of the main portion 102A. A material passage 108 (e.g., feed slot) and a user interface 110, including inputs such as buttons and displays such as lights, can be provided in the upper portion 102B. Thus, the upper portion 102B can provide a place for a user to interact with the shredder 100. Inside the upper portion 102B, a shredding engine 112 (FIGS. 6 and 13) is provided. The base portion 102C can optionally include casters for improving the mobility of the shredder 100. The door 104 is movable between a closed configuration (FIGS. 1-6) and an open configuration (FIG. 9). As illustrated, the door 104 is a side-swinging door. The door 104 is coupled to the outer housing 102 via one or more hinges 114 that define a vertical swing axis. The door 104 can be securely held in the closed position and selectively released for opening. For example, the closed position of the door 104 can be secured by magnets, a latch, a catch, etc.

The door 104, when closed, confines the interior space to preclude shredded material and/or dust from escaping to the surrounding environment. The closed door 104 also prevents access to the collection bin 106 until the door 104 is opened. The operation of the shredding engine 112 can be exclusively enabled (via a controller 1000) when the door 104 is closed. For this purpose, a door open sensor 116 can be provided on the door 104 or on the outer housing 102 for interfacing with the door 104. The door open sensor 116 can be a mechanical switch or a proximity sensor. In any case, the door open sensor 116 is electrically connected to the controller 1000 to provide a signal thereto, indicating whether the door 104 is open or closed. When the door open sensor 116 signals to the controller 1000 that the door 104 is open, the controller 1000 is programmed to prevent operation of the shredding engine 112.

Despite blocking access to the collection bin 106 during operation of the shredding machine 100, the door 104 is configured to provide prominent viewing of the collection bin 106. For example, the door 104 is provided with a large viewing window 118. The window 118 is transparent. The window 118 can be supported by a peripheral door frame 120. The door frame 120 120 can include one or more reinforcing members (e.g., beams, rods, or strips of metal). The door frame 120 may be opaque. In other constructions, the door 104 may be entirely constructed as a viewing window by having a transparent material construction. In yet other constructions, the door frame 120 is alternately configured and may not entirely surround a periphery of the window 118. With the door 104 closed, the window 118 can expose a majority of the collection bin 106. Whereas many conventional shredder bins only provide a view to the top of the collection bin to observe that the bin is at or near the full capacity, the window 118 in the door 104 can expose at least a vertical portion of the collection bin 106 spanning both above and below a reference line bisecting a height of the collection bin 106. It is also true that the window 118 of the illustrated construction exposes or displays, in front elevation view, a majority of a frontal area of the collection bin 106. Although the door 104 with the window 118 of the illustrated construction is configured to display the collection bin 106 in large part while preventing direct access, other constructions may be provided without a door. In such a construction, a front of the collection bin 106 is directly exposed to the front of the shredder. A door open sensor need not be provided. Operation of the shredding engine 112 may be enabled solely when the collection bin 106 is in a predetermined operating position.

Figure 1:
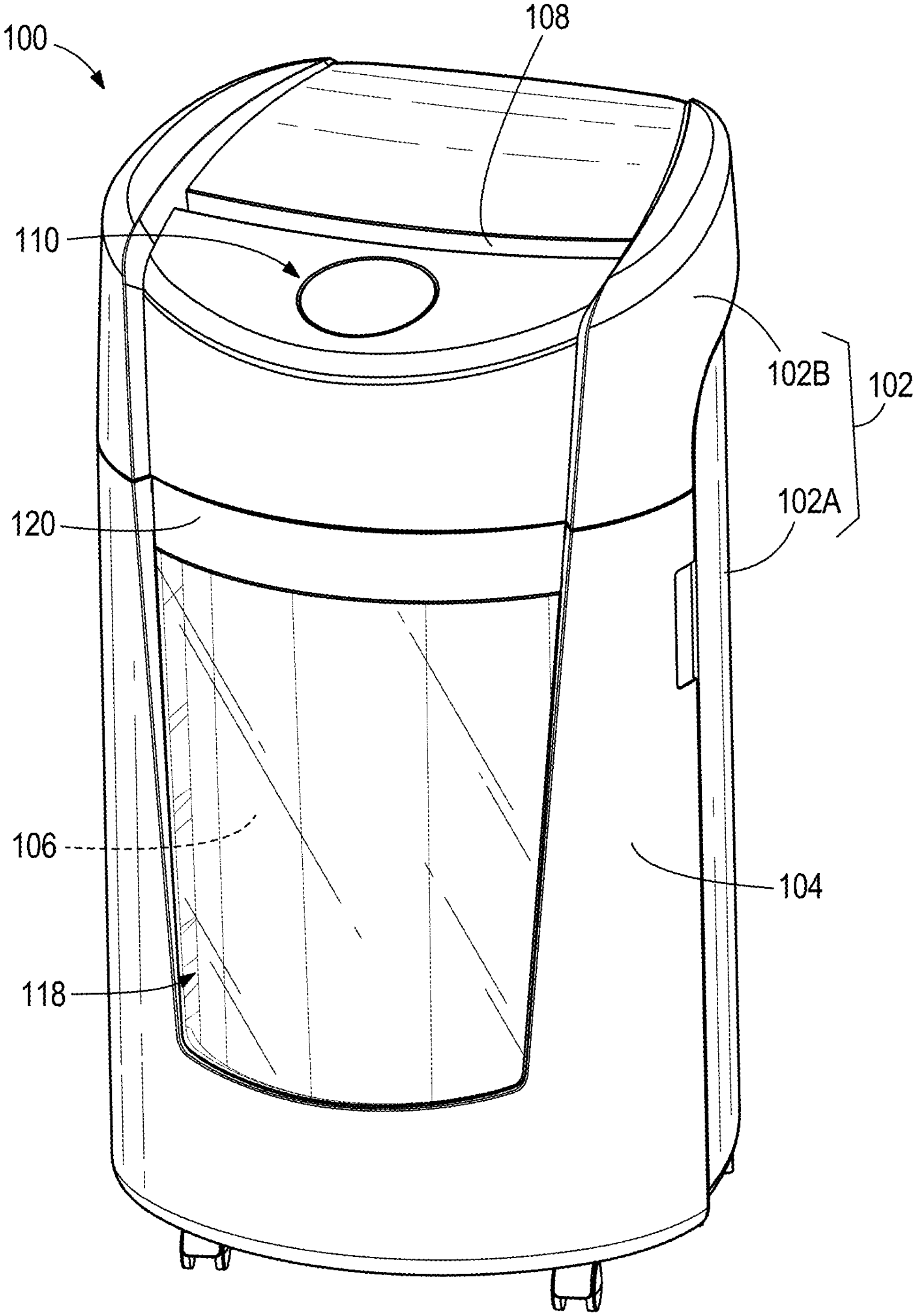
FIG. 1 is a front perspective view of a shredding machine according to one embodiment of the present disclosure.
Figure 2:
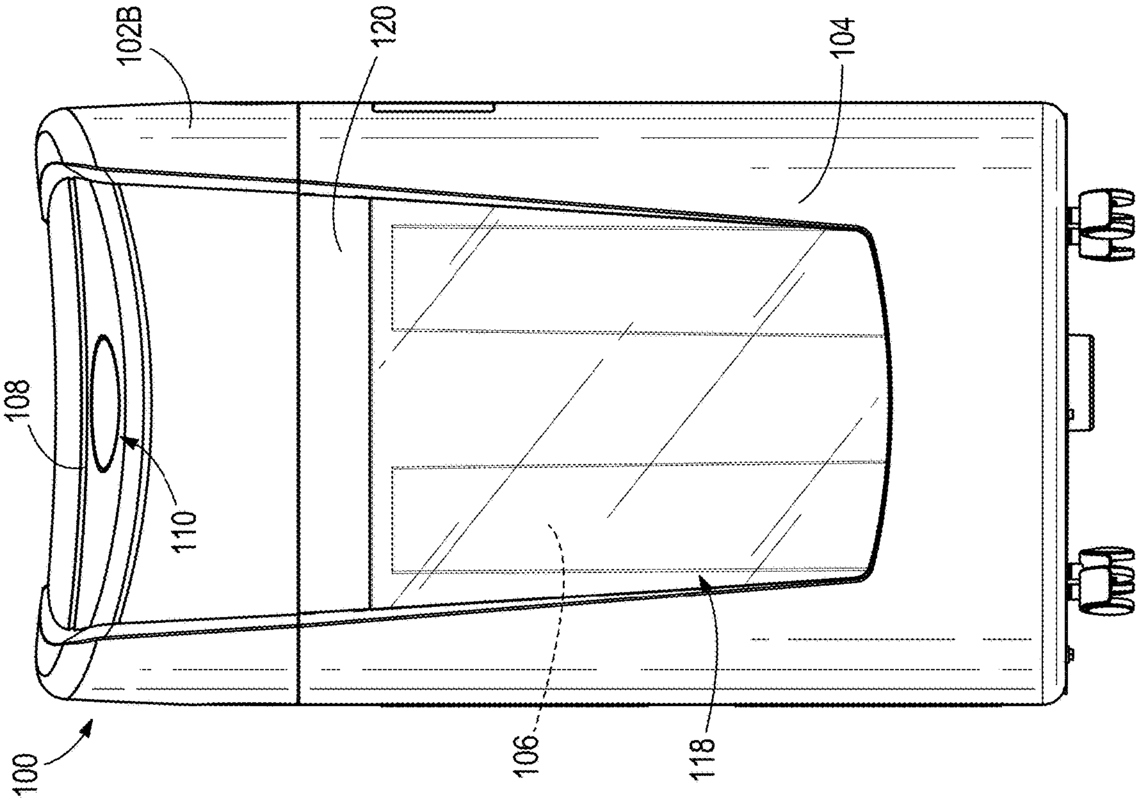
FIG. 2 is a front elevation view of the shredding machine of FIG. 1.
Figure 3:
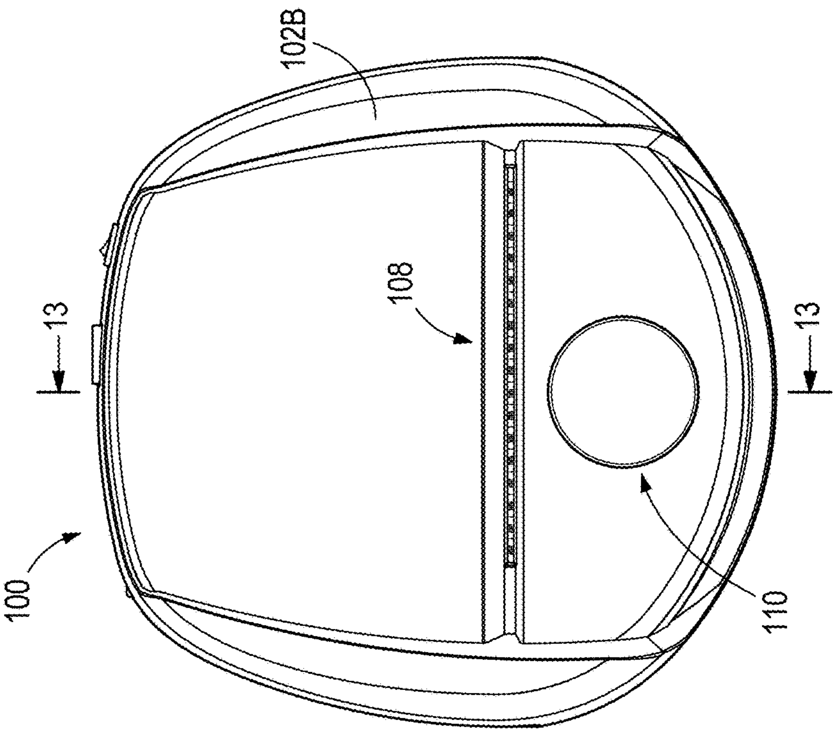
FIG. 3 is a top plan view of the shredding machine of FIG. 1.
Figure 5:
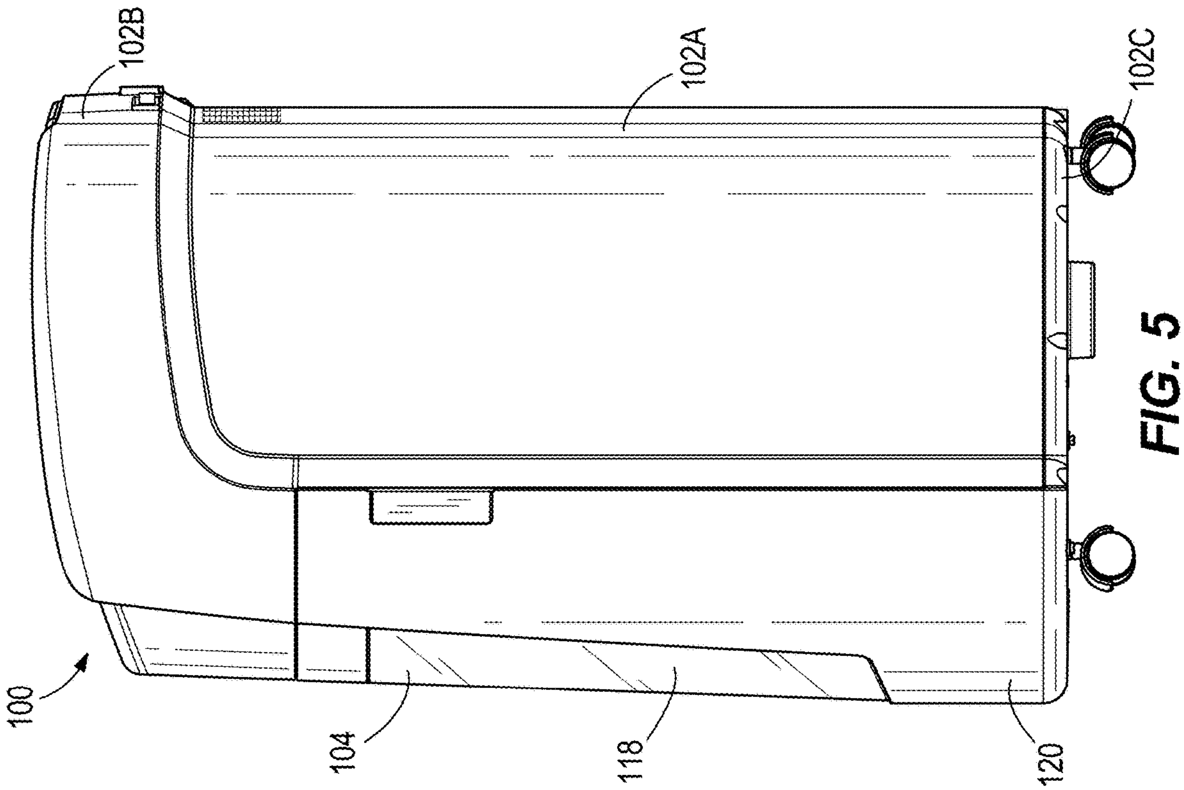
FIG. 5 is a right side elevation view of the shredding machine of FIG. 1.
Figure 4:
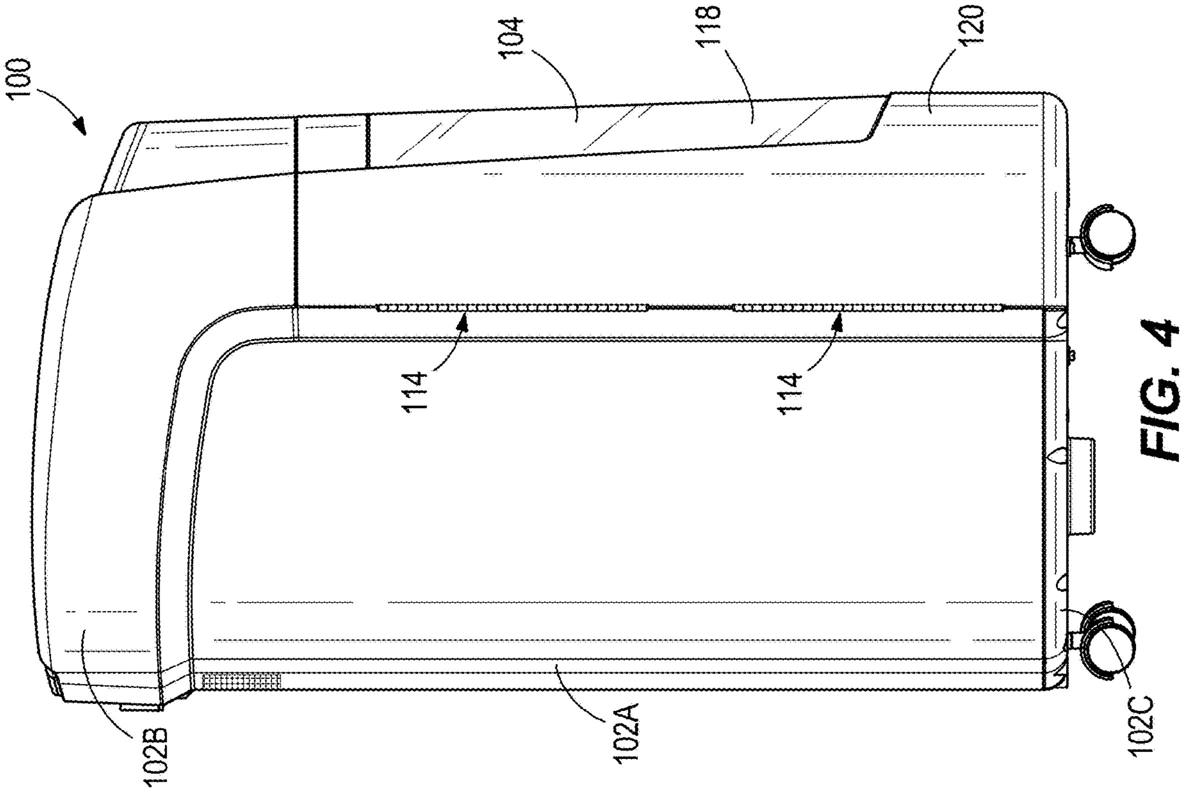
FIG. 4 is a left side elevation view of the shredding machine of FIG. 1.
Figure 6:
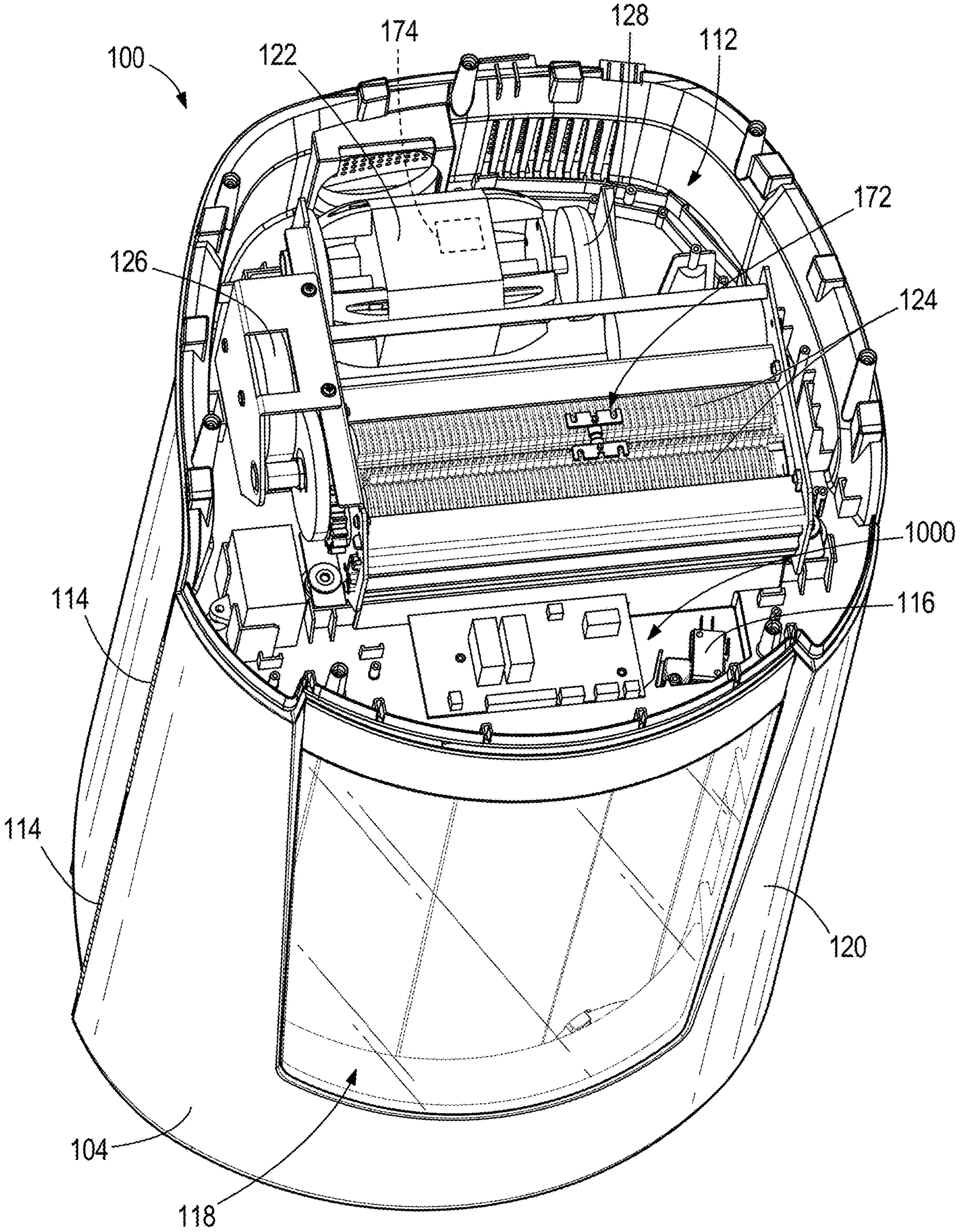
FIG. 6 is a top perspective view of a shredding engine within the shredding machine of FIG. 1.
Figure 13:
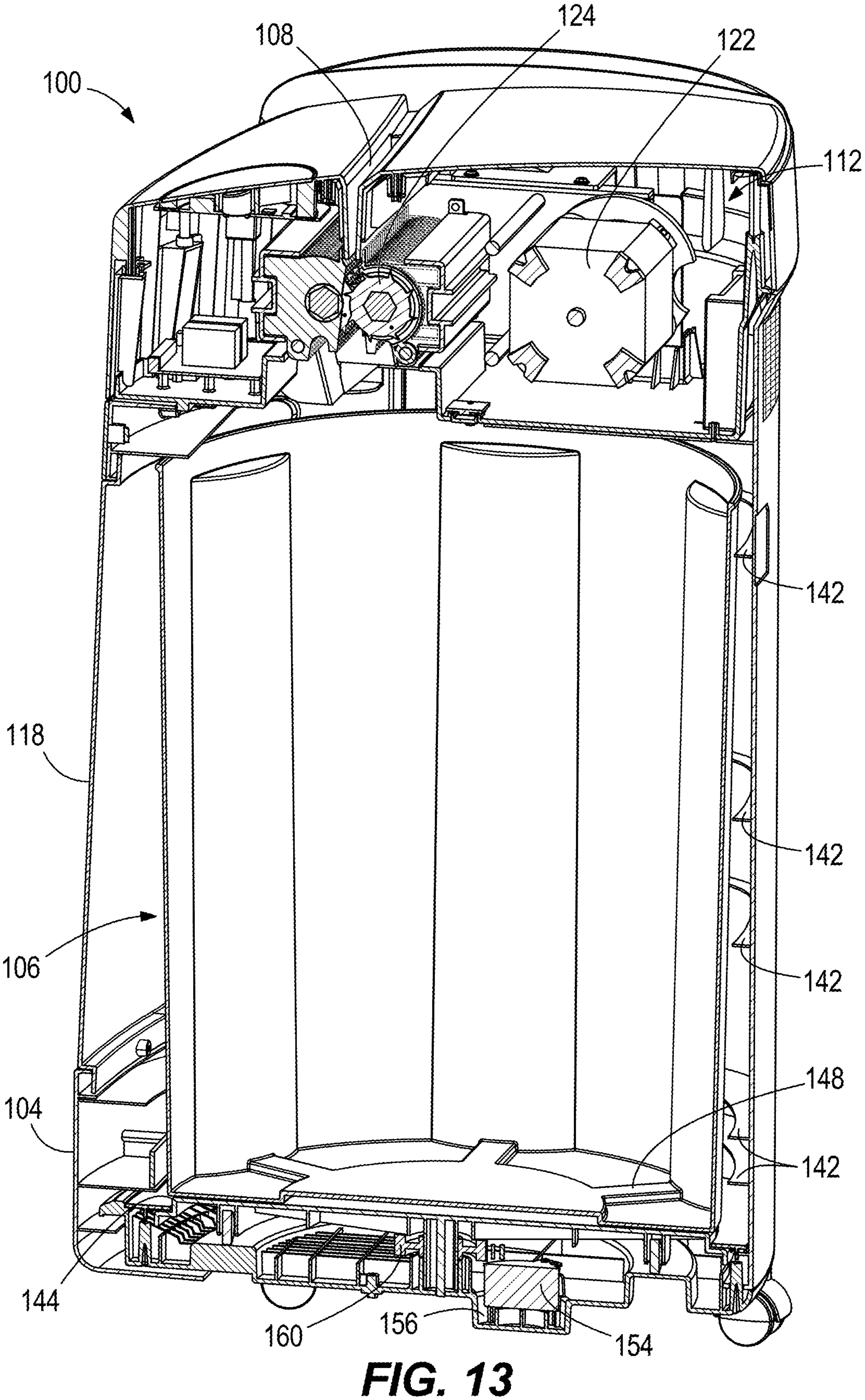
FIG. 13 is a cross-section view of the shredding machine of FIG. 1.

The shredding engine 112 is shown in FIG. 6 where the upper portion 102B of the outer housing 102 is removed, and again in the cross-section of FIG. 13. The shredding engine 112 includes a shredding motor 122 and a plurality of interleaved cutters 124 driven to rotate by the shredding motor 122. The shredding motor 122 can drive rotation of the interleaved cutters 124 through a transmission device 126 including belts, gears, etc. In some constructions, the shredding motor 122 drives a first one of the cutters 124, which in turn drives a second one of the cutters 124. The shredding engine 112 can be contained within the upper portion 102B of the outer housing 102 with the exception of a discharge side of the cutters 124 that are exposed to the top of the interior space and the collection bin 106. The outer housing 102 can be vented for airflow, and one or more fans 128 can operate to positively drive a cooling airflow. The shredding engine 112 is positioned above the interior space so that shredded material is delivered from the interleaved cutters 124 to the collection bin 106 (solely) by gravity. The cutters 124 rotate about parallel axes in two opposite directions. The cutters 124 each comprise a plurality of knives along the length thereof, the knives of the two cutters 124 cooperating with each other to shred material into small pieces. Operation of the two cutters 124 also acts to automatically and continuously pull the material through the material passage 108.

The shredding motor 122 of the shredding engine 112 can be powered from mains electricity via a power cord to a wall outlet. However, the shredder 100 can alternately be configured with an on-board rechargeable power supply (e.g., battery pack). As such, the shredder 100 can be more mobile and transported/used in a variety of locations, some of which may not have mains power access. Such a shredder may operate with a charging docking station to recharge the on-board rechargeable power supply. The charging docking station can have mains power and define an interface for receiving the shredder to be docked and recharged.

Figure 7:
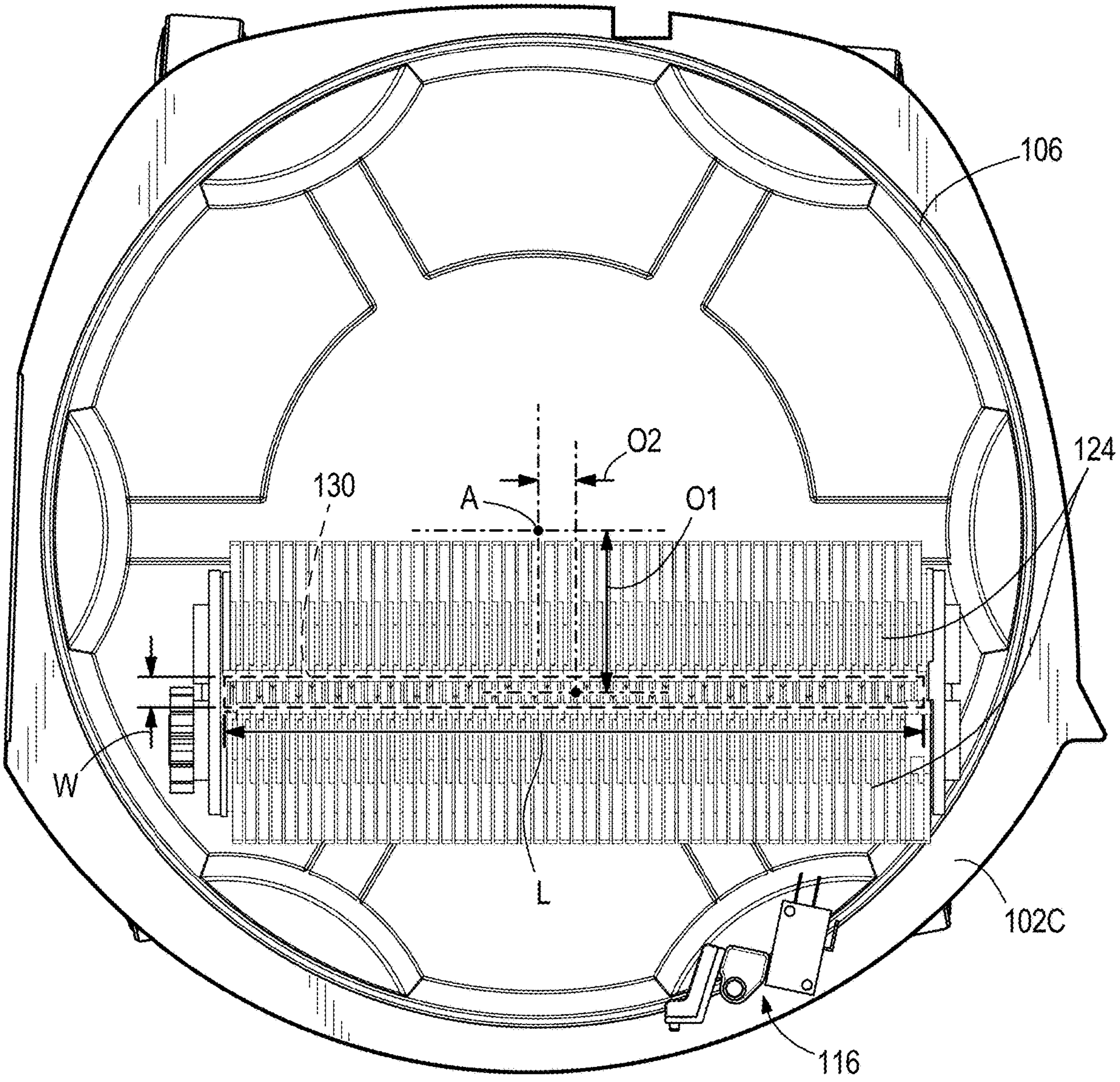
FIG. 7 is a top plan view illustrating the relative positioning of the rotary cutters of the shredding engine with respect to a collection bin of the shredding machine of FIG. 1.
Figure 10:
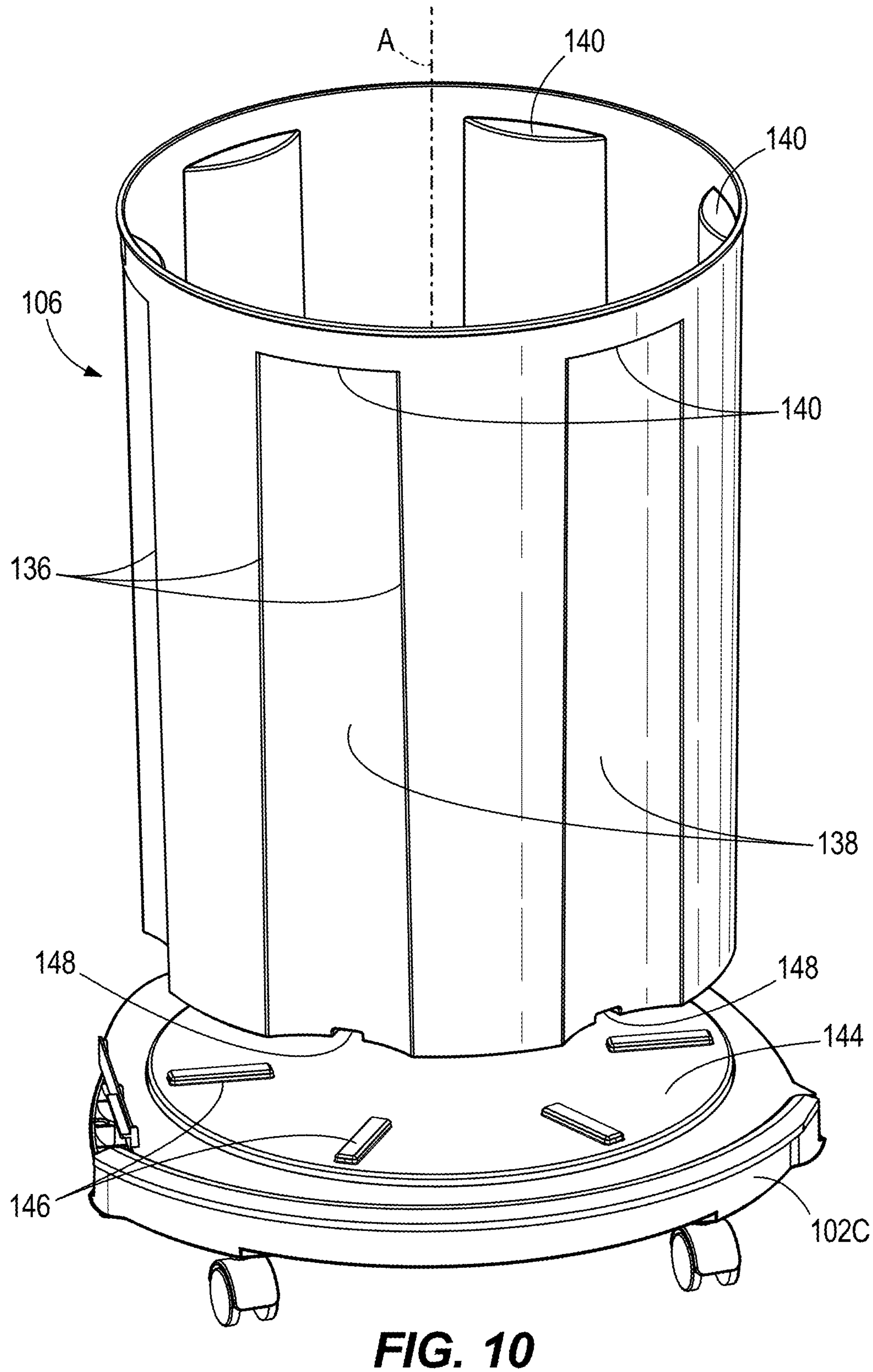
FIG. 10 is an exploded assembly view of the collection bin and a turntable of the shredding machine of FIG. 1.

The collection bin 106 defines a central vertical axis A as shown in at least FIGS. 7 and 10. As described in further detail below, the collection bin 106 is configured to rotate within the outer housing 102 about the central vertical axis A during operation of the shredding engine 112. Shredded material is configured to discharge from the cutters 124 along a discharge zone 130. The discharge zone 130 can be generally rectangular and may correspond to the area of overlap between the cutters 124 during their rotation. The discharge zone 130 can define a length L that exceeds a width W thereof. Although the shredded material is discharged to fall vertically parallel to the central vertical axis A, the entirety of the discharge zone 130 is offset from the central vertical axis A in top plan view. In a direction perpendicular to the length L of the discharge zone 130, a center of the discharge zone 130 is offset by a first offset distance O1. The first offset distance O1 can be 13% to 20% of the outer diameter D of the collection bin 106. In some constructions, first offset distance O1 can be 15% to 18% of the outer diameter D of the collection bin 106. In some constructions, the first offset distance O1 is 50 mm and the outer diameter D of the collection bin 106 is 300 mm (resulting in a 1:6 ratio). In a direction parallel to the length L of the discharge zone 130, there may be a non-zero second offset distance O2 of the center of the discharge zone from the central vertical axis A. The second offset distance O2 can be less than the first offset distance O1.

In some constructions, one or more guide walls are included below the cutters 124. The guide wall(s) extend below the cutters 124 to create a delivery zone. In some cases, the guide wall(s) can simply limit the amount of scatter that is possible for shredded material downstream of the cutters 124. In other cases, one or more guide walls can taper directly into a vertical path created by the discharge zone 130. Such guide walls act to further constrain the shredded material away from an outer perimeter of the collection bin 106. The guide walls can be separate from an in addition to a box-shaped recess 127 of the upper housing portion 102B that receives the cutters 124. In the illustrated construction, as shown in FIG. 9, a first guide wall 131A (at the left side as facing the front of the shredder 100) extends downward from the upper housing portion 102B. From the proximal (top) end, the first guide wall 131A is inclined or tapered toward the rear of the shredder 100. The first guide wall 131A only extends along a front side of the housing recess 127, and only in the vicinity of a corner area where the housing recess 127 comes closest to the perimeter of the collection bin 106 in plan view. A second guide wall 131B (at the right side as facing the front of the shredder 100) extends downward from the upper housing portion 102B near the opposite lengthwise end of the discharge zone 130. The second guide wall 131B is provided in the vicinity of the other front corner area of the housing recess 127. The second guide wall 131B has a first portion inclined or tapered toward the rear of the shredder 100 and a second portion inclined or tapered toward the left side of the shredder 100. As such, both portions of the second guide wall 131B further limit or guide shredded material away from the perimeter of the collection bin 106 and closer to the central vertical axis A.

By offsetting the cutters 124 and the discharge zone 130 formed thereby, in addition to rotating the collection bin 106, the shredded material distributes evenly across the cross-section of the collection bin 106 as opposed to creating a pronounced mound or pyramid. Mounding of shredded material is common in shredders and typically results in premature stoppages. The user will have to stop shredding and empty the bin, or at least redistribute the shredded material before the full capacity of the collection bin is reached. The shredder 100 has a bin full sensor 132 (FIG. 9) connected to the controller 1000 and operable to detect and report when the top of the shredded material is at or above a threshold or "full" value. The bin full sensor 132 can be an infrared (IR) sensor, for example. In past shredders, careful consideration must be given to placement and/or aim of the bin full sensor to provide accurate results, as the shredded material will be at substantially different levels in different areas of the collection bin's cross-section. The shredder 100 has no such constraints, as the collection bin 100 will fill in a level manner throughout its operation. In other words, the top surface of the shredded material in the collection bin is substantially flat or horizontal such that an accurate measure of the bin's fill level can be ascertained anywhere across the cross-section. Filling the collection bin 106 in this manner also allows reliable operation of the shredder 100, without operator interaction on the collection bin 106, up until the collection bin 106 is at or very near its full capacity. In practice, the shredder 100 can shred more material (e.g., sheets of paper) for a given collection bin volume before the shredder stops due to a bin full condition. In some constructions, the shredder 100 can process at least 500 sheets of paper into the collection bin 106 before triggering the bin full sensor 132 (without any intermittent leveling of the shredded material by the user). In practice, the inventor has found the shredder 100 to accommodate 540 sheets of paper (an increase of about 150 sheets, or about 38%) when the collection bin 106 is rotated vs. a conventional stationary configuration. This is with the collection bin 106 having an outer diameter D of 300 mm and a height of 450 mm, for an overall capacity of about 35 L. In other embodiments, the collection bin 106 can be less (e.g., 15 L or 22 L) or more (e.g., 45 L or 60 L) than 35 L.

Although the security level (e.g., P4 or P5) of the shredding engine 112 relates to the size of the particles into which the paper is cut, another factor that can affect the ability of the collection bin 106 to receive maximum sheet capacity is the shape of the particles produced by the shredding engine 112. In some constructions, the shredding engine 112 produces particles having a shape with substantial curl. When many of these particles are piled together through the shredding of many sheets, a significant amount of airspace results within the pile of shredded particles. Airspace reduces the number of sheets that the collection bin 106 can accommodate. To increase the number of sheets that the collection bin 106 can accommodate, the shredding engine 112 can be configured to output flat particles (e.g., by slicing the sheet rather than punching) when the cutters 124 are rotated. For example, the shredding engine 112 can incorporate cutters with clean cut blades such as those disclosed in Chinese Utility Model CN 210411045U from Comix Business Machine Shenzhen Co. Ltd., the entire contents of which is incorporated by reference herein.

The shredder 100 can include an interior lighting element 134 (FIG. 9) in some constructions. The interior lighting element 134 can be an LED or plural LEDs. The interior lighting element 134 can be configured to emit light in the visible spectrum into the interior space of the outer housing 102, and thus into the collection bin 106. The interior lighting element 134 can emit light in a single color (e.g., blue) during normal operation of the shredding engine 112. In other constructions, the light can emit in multiple colors or may change colors during operation. The color of the interior lighting element 134 can be set or changed intrinsically (e.g., colored light emitted directly from one or more LEDs) or with one or more colored filters through which the light is passed. In some constructions, the interior lighting element 134 changes from a first color (e.g., blue) to a second color (e.g., red) in response to the shredder changing operational status. For example, when the shredder 100 stops automatically, despite material being sent to the shredding engine 112, the color of the interior lighting element 134 can change from the first color to the second color as a visual indicator to a user. Conditions leading to automatic stoppage can include bin full, door open, over temperature threshold, or over input thickness threshold.

The collection bin 106 is constructed of transparent material. As such, the contents of the collection bin 106 can be observed easily through the side wall thereof. In some constructions, the collection bin 106 is clear (uncolored), but may be tinted (colored) in other constructions. The transparent collection bin 106 also enables viewing of the shredded material falling from the cutters 124. In concert with the interior illumination from the lighting element 134, the shredder 100 provides a sense of theatrics or fun to be observed by a user or others nearby during its otherwise mundane operation. In some constructions, the collection bin 106 is shaped to further interact with the interior illumination, for example by refracting the light. For example, the collection bin 106 has an uneven sidewall shaping as opposed to a simple cylindrical one. The side wall of the collection bin 106 can include a plurality of vertical edges 136 that change the direction of the light refraction as viewed from outside the transparent window 118. In the illustrated construction, the vertical edges 136 bound scallops 138 formed in the collection bin 106. Each scallop 138 can be formed by a concavity in the exterior. The scallops 138 (e.g., at least 4, 5, or 6) can be distributed evenly or unevenly about the circumference of the collection bin 106. The scallops 138 can have a simple arc shape as shown or a more complex shape. The arc shape can have a constant or changing radius. A hand grip 140 for the user to lift the collection bin 106 is created adjacent the top edge of the collection bin 106 where each scallop 138 ends (e.g., at a horizontal ledge). Thus, numerous lifting points are provided, and the rotational orientation does not impact the ability of the user to easily lift the collection bin 106 using one or more of the hand grips 140.

Figure 8:
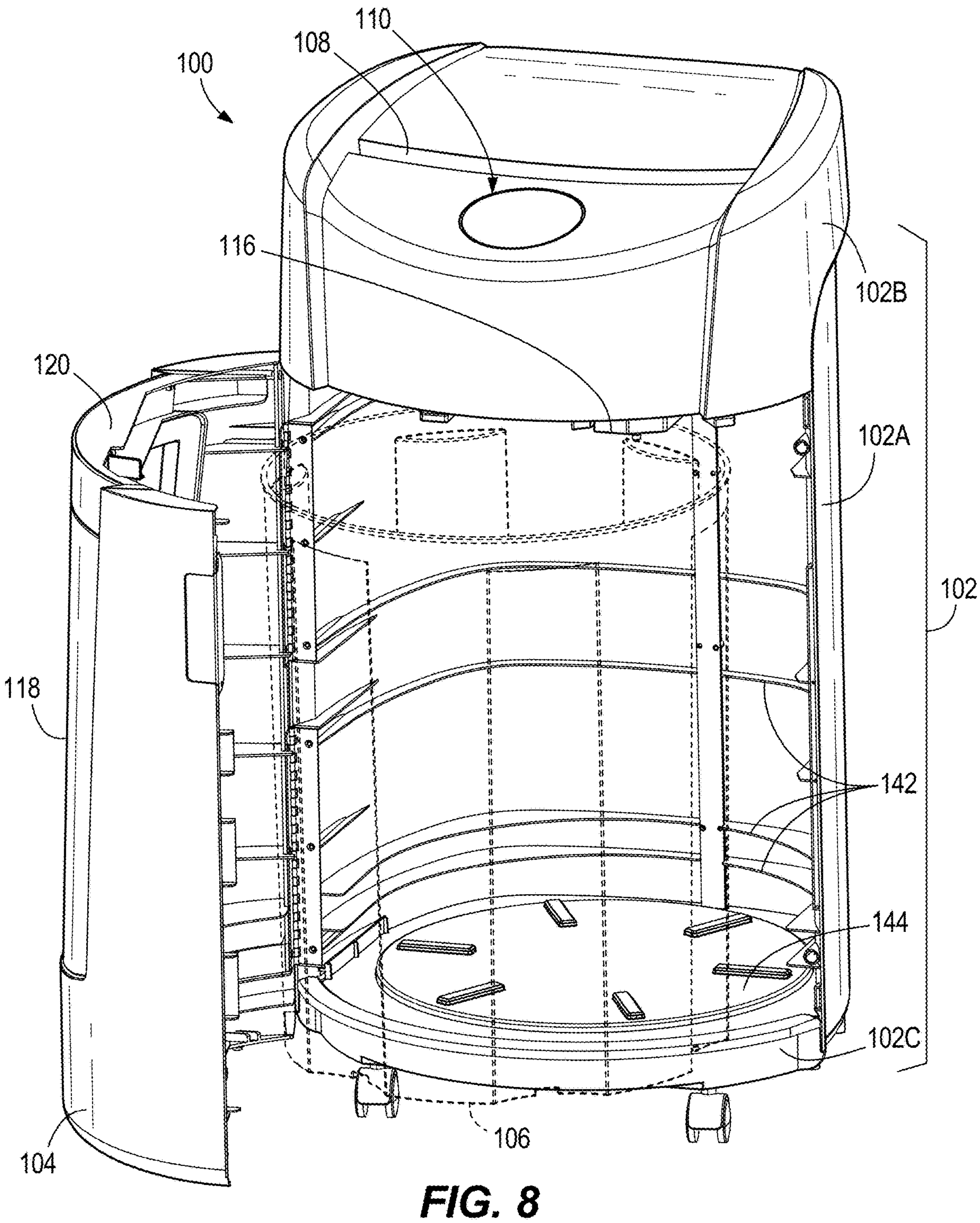
FIG. 8 is a front perspective view of the shredding machine of FIG. 1, showing the door open and the collection bin partially removed.

As shown in at least FIGS. 8 and 9, the outer housing 102 includes a plurality of horizontally extending ribs 142 that project inwardly in the interior space. The ribs 142 can strengthen the main portion 102A of the outer housing 102, which can be formed of a relatively thin material for cost and weight objectives. The ribs 142 can also serve to gently guide the collection bin 106 into a centered position within the interior space. Similar ribs can be provided on the interior of the door 104. The centered position corresponds to an alignment between the central vertical axis A of the collection bin 106 and a corresponding axis of a turntable 144 positioned at the bottom of the interior space, and more particularly, positioned at least partially in the base portion 102C of the outer housing 102. As described below, the collection bin 106 is supported by and rotatably driven by the turntable 144.

As best shown in FIG. 10, the top surface of the turntable 144 includes at least one rotation drive feature complementary to at least one rotation drive feature of a bottom surface of the collection bin 106. As illustrated, the respective rotation drive features are complementary lugs 146 and recesses 148 that define a positive interface for conferring rotation of the turntable 144 to the collection bin 106. According to the illustrated embodiment, the lugs 146 are provided on the turntable 144, and the recesses 148 are provided on the collection bin 106. In other constructions, this relationship is reversed, or lugs and recesses can be provided on both the turntable 144 and the collection bin 106. The positive interface defined by the lugs 146 and recesses 148 avoids complete reliance on friction to drive the collection bin 106 from the turntable 144. However, in other constructions, the turntable 144 may be configured to drive rotation of the collection bin 106 solely by friction.

Figure 11:
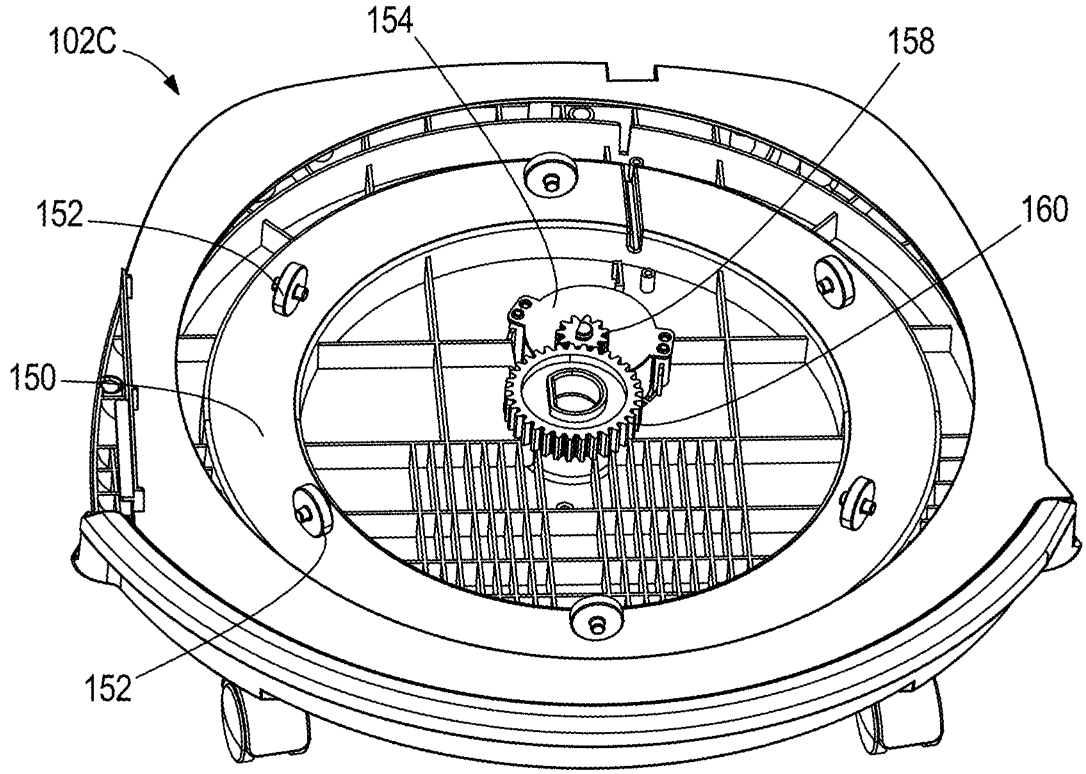
FIG. 11 is a top perspective view illustrating a turntable drive system of the shredding machine of FIG. 1.
Figure 12:
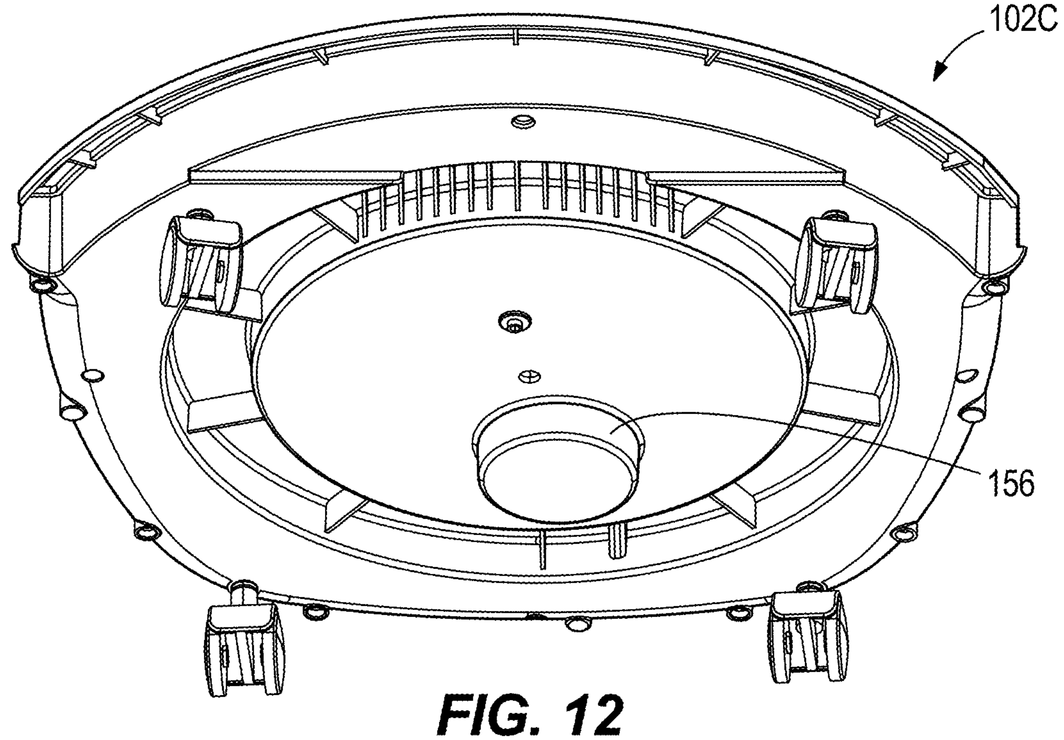
FIG. 12 is a bottom perspective view of a base portion of the shredding machine of FIG. 1.

The turntable 144 is rotatably supported on a track 150 (e.g., flat horizontal track surface) of the base portion 102C of the outer housing 102 as shown in FIGS. 11 and 13. The track 150 can be a raised surface forming a ring with a central recess therein. The turntable 144 can be supported above the track 150 by a plurality of wheels 152. The wheels 152, which are directed to roll in a circumferential direction about the central vertical axis A, are coupled to a bottom surface of the turntable 144 in the illustrated construction. This is just one example of a rolling support assembly provided between the turntable 144 and the outer housing 102. Rotation of the turntable 144 is driven by a bin motor 154 (FIGS. 11 and 13). The bin motor 154 is coupled to the base portion 102C of the outer housing 102 below the turntable 144. As shown in FIGS. 12 and 13, the bin motor 154 can be at least partially accommodated in a pocket or recess 156. The pocket 156 can form an outward projection along a bottom surface of the base portion 102C.

In some constructions, the bin motor 154 is a synchronous motor. The shredder 100, which does not include a variable frequency drive, enables a single running speed of the synchronous bin motor 154. However, commonly available motors that are suitable sized may run at speeds that substantially exceed the desired rotation speed of the collection bin 106. In the illustrated construction, the bin motor 154 includes an output drive pinion 158. The drive pinion 158 rotates at the running speed of the bin motor 154, which is either the speed of the rotor thereof or a complementary speed determined by an integral gearbox of the bin motor 154. The drive pinion 158 drives a turntable input gear 160 to set a speed-reduction drive ratio of at least 2:1. As such, the turntable 144 rotates at half-speed or less (e.g., ⅓ speed) compared to the running speed of the bin motor 154. The turntable input gear 160 can be integrally formed on the bottom of the turntable 144 or separately formed and coupled for co-rotation. The bin motor 154, the drive pinion 158, and/or the turntable input gear 160 can be at least partially received in the recess within the turntable track 150. In the illustrated construction, the bottom of the turntable 144 includes a D-shaped pin received in a D-shaped receptacle of the turntable input gear 160 for co-rotation. In some constructions, the bin motor 154 is configured to rotate the collection bin 106 at a speed of at least 2 rpm and less than 12 rpm. In some constructions, the bin motor 154 is configured to rotate the collection bin 106 at a speed of at least 3 rpm and less than 7 rpm. The rotation speed of the collection bin 106 can be selected to achieve the desired uniform distribution of shredded material while also being relaxing and fun to watch for the average observer. In some constructions, the speed of rotation of the collection bin 154 can be variably controlled, either automatically or by user selection.

Figure 14:
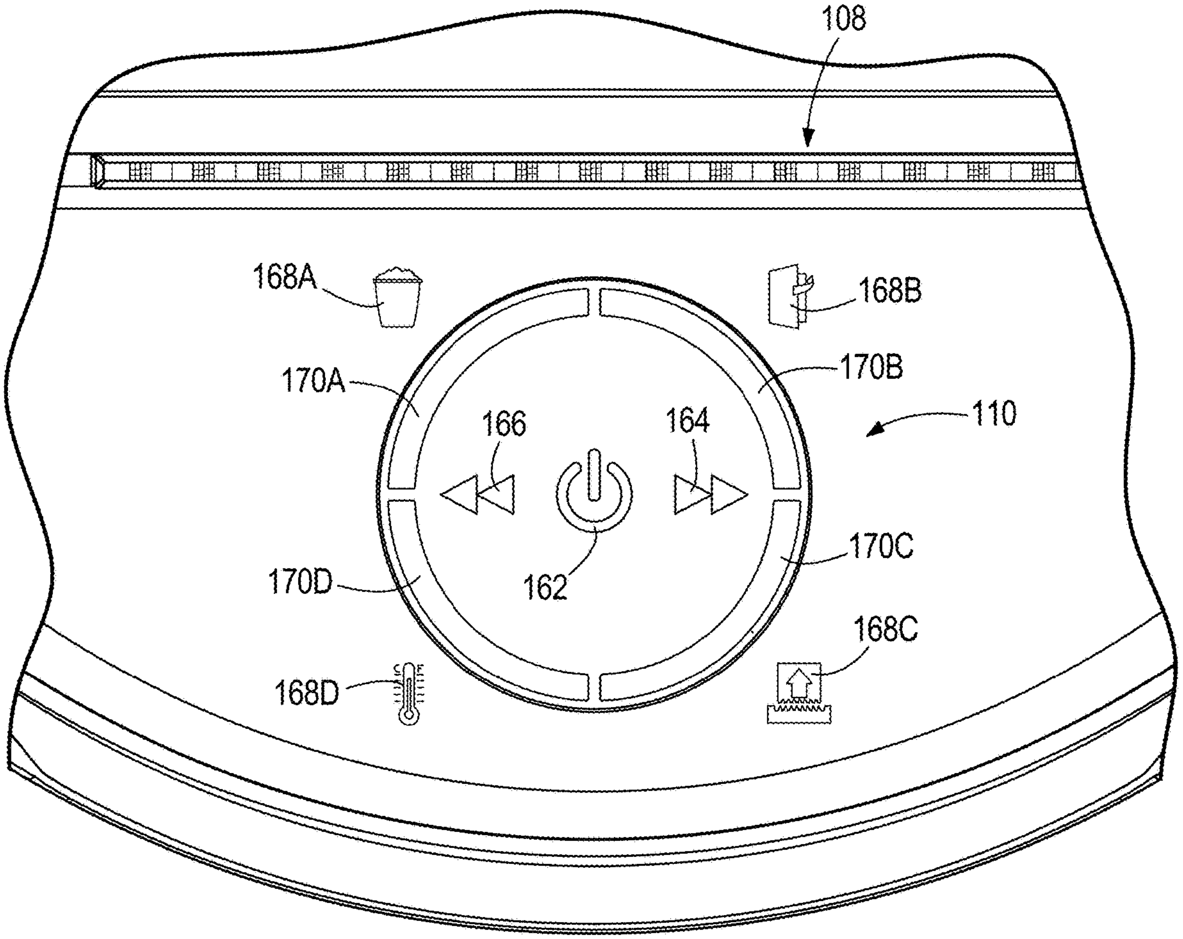
FIG. 14 is a detail view of a user interface of the shredding machine of FIG. 1.

Turning now to the user interface 110 shown in detail in FIG. 14, it can be seen that the user interface 110 includes a power button 162, a forward feed button 164, a reverse feed button 166, and a plurality of icons 168A, 168B, 168C, 168D associated with a plurality of lights 170A, 170B, 170C, 170D. The buttons 162, 164, 166 can be physical controls, touch sensitive controls or a combination of both. The power button 162 is used to turn the shredder 100 on (e.g., enabling the shredding engine 112 to operate) and off (e.g., preventing the shredding engine 112 from operating). The power button 162 can be illuminated. The power button 162 can optionally change color in response to different states of operation of the shredder 100. The forward and reverse feed buttons 164, 166 allow direct user control over the rotation operation direction of the shredding engine 112, for example when desiring to reverse material fed to the shredder or clear a jam. The icon 168A is a bin full icon and corresponds to the status of the bin full sensor 132. The icon 168B is a door open icon and corresponds to the status of the door open sensor 116. The icon 168C is an anti-jam icon (i.e., too many sheets, or generally over input thickness threshold) and corresponds to the status of a material sensor 172 (FIG. 6) in the material passage 108. The icon 168D is an over temperature icon and corresponds to the status of a temperature sensor 174 (FIG. 6) of the shredding motor 122. As with the other sensors of the shredder 100, the material sensor 172 and the temperature sensor 174 are connected to the controller 1000 so that the controller 1000 can receive signals therefrom and respond according to a programmed algorithm thereof.

The plurality of lights 170A, 170B, 170C, 170D are respectfully associated with one of the icons 168A, 168B, 168C, 168D such that selective illumination of one of the lights indicates visually to the user why the shredder 100 either stopped operating or did not start operating. Selective illumination can include illuminating only the one selected light of the plurality of lights, illuminating the one selected light in a different color, or flashing the one selected light. Under normal operating conditions, with the shredding engine 112 running, the plurality of lights 170A, 170B, 170C, 170D are configured to perform a rotation animation.

This can be accomplished by sequential illumination of one or more of the lights 170A, 170B, 170C, 170D in a manner that mimics rotation. In particular, the lights 170A, 170B, 170C, 170D are configured to form segments (e.g., four quadrants) of a circle. In other constructions, there may be greater or fewer than four segments that make up the illuminated display. In some constructions, the display has a non-circular shape (e.g., oval, rectangular, etc.). Optionally, each of the plurality of lights 170A, 170B, 170C, 170D can include multiple lighting elements (e.g., LEDs). Such multiple lighting elements can be uniformly controlled, and may give the impression of a single light, for example by being covered with a diffuser. In other constructions, each of the plurality of lights 170A, 170B, 170C, 170D can include multiple, separately-visible lighting elements.

Although the shredder 100 may be operated in a number of ways, one construction provides that the controller 1000 is programmed to start the shredding motor 122 and the bin motor 154 at the same time in response to the material sensor 172 detecting material at the material passage 108. Of course, continued operation of the shredding motor 122 and the bin motor 154 is dependent upon the thickness of the material (or sheet quantity) not exceeding the predetermined threshold. In some constructions, the interior lighting element 134 is also set by the controller 1000 to illuminate in response to the material sensor 172 detecting material at the material passage 108. In some constructions, the user interface 110 is also set by the controller 1000 to commence the rotation animation in response to the material sensor 172 detecting material at the material passage 108.

Figure 15:
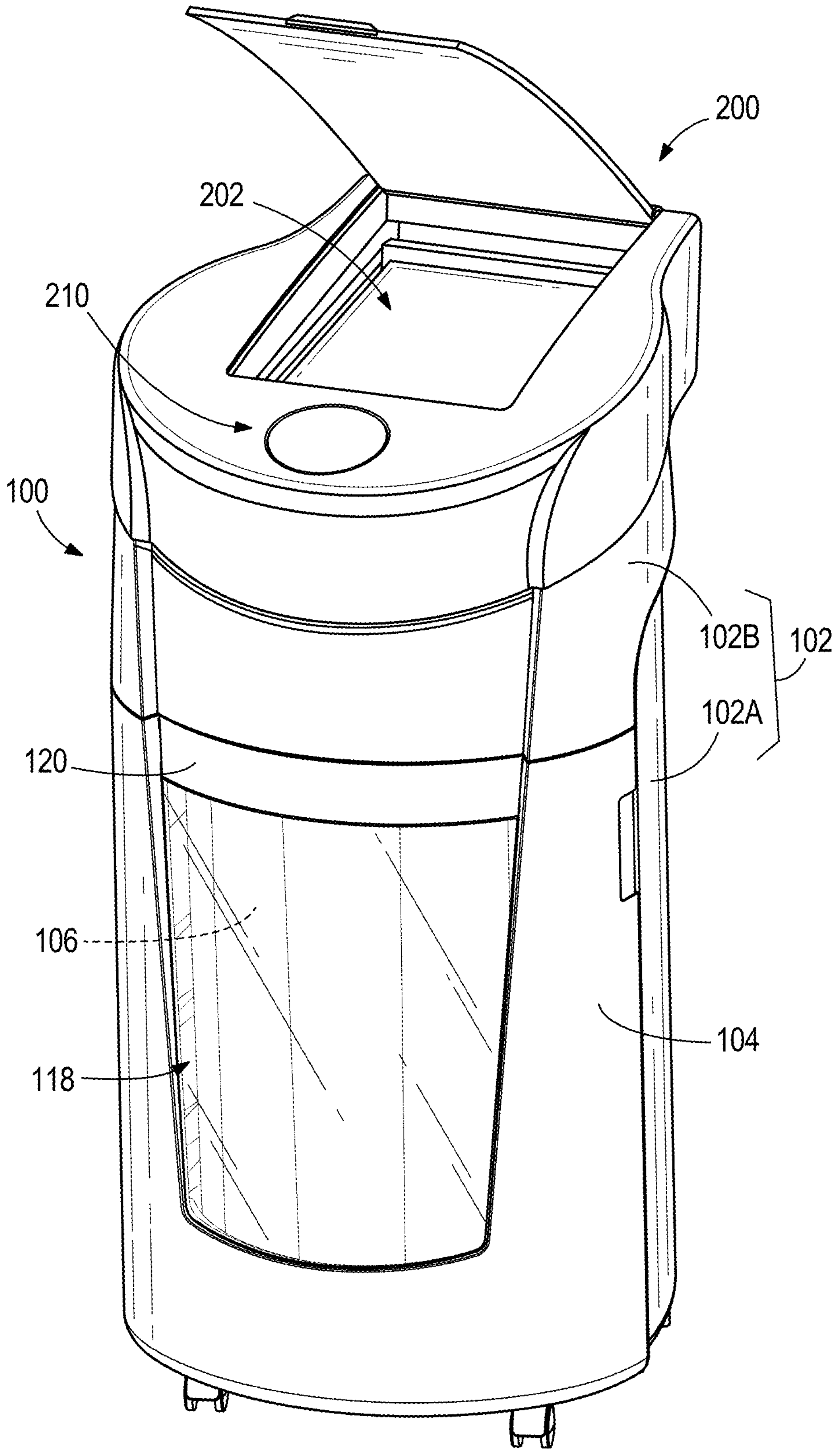
FIG. 15 is a top perspective view of an auto-feed shredding machine according to another embodiment of the present disclosure.

FIG. 15 illustrates a shredder 200 of a second embodiment. The shredder 200 can include a majority of common features with the shredder 100 described above and illustrated in FIGS. 1-14. As such, the description here focuses only on differences unique to the shredder 200. Whereas the shredder 100 is a so-called manual feed shredder by which material is provided to the material passage 108 by a user in batches within the allowable thickness limit, the shredder 200 is a so-called auto-feed shredder configured to allow bulk loading of material into a bin or tray 202 (also referred to as a "hopper"). Material in the auto-feed tray 202 can greatly exceed that which the shredding engine can process in one pass. A feed mechanism operates to automatically direct sheets from the auto-feed tray 202 through a material passage to the cutters of the shredding engine so that the shredder can operate continuously to shred the sheets without continuous interaction from the user. As such, the collection bin is sized so that, when empty, it can receive the shredded material produced by the full capacity of sheets accommodated in the auto-feed tray 202. An additional material passage (e.g., on top of the auto feed tray 202) can allow manual feed by the user. The shredder 200 can include the rotatable collection bin as in the shredder 100 to evenly distribute the shredded material. The shredder 200 can also include the interior lighting as in the shredder 100 to illuminate the inside of the rotating collection bin and the shredded material falling into the collection bin from the cutters. Although differently configured, the shredder 200 includes a user interface 210 that provides some or all of the same features as the user interface 110 of the shredder 100, including but not limited to the sequential illumination of one or more of the lights in a manner that mimics rotation during shredding and rotating the collection bin.

Although some aspects have been described in detail with reference to certain preferred embodiments, variations and modifications exist within the scope and spirit of one or more independent aspects as described. Various features and advantages of the invention are set forth in the following claims.

What is claimed is:

1. A shredding machine comprising:

an outer housing including a main portion and a door movably coupled to the main portion, the door movable between a closed configuration and an open configuration, the outer housing defining an interior space;

a shredding engine including a shredding motor and a plurality of interleaved cutters, the shredding engine positioned above the interior space;

a material passage configured to receive material to be shredded and direct the material to be shredded to the plurality of interleaved cutters;

a collection bin constructed of transparent material and removably received inside the interior space, the collection bin being open at a top end and defining a central vertical axis; and an interior lighting element operable to emit light in the visible spectrum into the collection bin, wherein, during operation of the shredding engine, the collection bin is configured to rotate within the outer housing about the central vertical axis and the interior lighting element is energized to illuminate shredded material as it falls into the collection bin.

2. The shredding machine of claim 1, wherein the transparent material of the collection bin is uncolored.

3. The shredding machine of claim 1, wherein the collection bin is scalloped/has a plurality of vertical edges.

4. The shredding machine of claim 3, wherein handles are formed at the upper ends of the scallops.

5. The shredding machine of claim 1, further comprising a material sensor and a controller coupled to the material sensor, the interior lighting element, and a bin motor configured to drive the rotation of the collection bin, wherein the controller actuates the interior lighting element and the bin motor in response to the material sensor.

6. The shredding machine of claim 1, further comprising a turntable positioned at the bottom of the interior space and a bin motor configured to rotate the turntable.

7. The shredding machine of claim 6, wherein a top surface of the turntable and a bottom surface of the collection bin define complementary lugs and recesses to define a positive interface for conferring rotation of the turntable to the collection bin.

8. The shredding machine of claim 6, wherein the bin motor is a synchronous motor with a drive pinion, and wherein the drive pinion drives an input gear of the turntable to set a speed-reduction drive ratio of at least 2:1.

9. The shredding machine of claim 1, further comprising a bin motor configured to rotate the collection bin at a speed of at least 2 rpm and less than 12 rpm.

10. The shredding machine of claim 1, further comprising a bin motor configured to rotate the collection bin at a speed of at least 3 rpm and less than 7 rpm.

11. The shredding machine of claim 1, wherein the door is a side opening door coupled to the outer housing about a vertical hinge.

12. The shredding machine of claim 1, wherein the door comprises a frame and a transparent window, and the transparent window makes up a majority of the frontal area of the door.

13. The shredding machine of claim 1, further comprising an operator interface including one or more buttons and three or more exterior lights configured to illuminate sequentially during operation of the shredding engine to provide an animation mimicking rotation.

14. The shredding machine of claim 13, wherein the exterior lights are configured to stop the sequential illumination and one of the three or more exterior lights is configured to illuminate in an alternate color in response to an automatic shutdown of the shredding engine.

15. The shredding machine of claim 1, wherein the interior lighting element is configured to illuminate the collection bin with blue light.

16. The shredding machine of claim 1, wherein an outer diameter of the collection bin is 300 mm and the material passage is offset from the central vertical axis by 50 mm.

17. The shredding machine of claim 1, wherein the material passage is formed by a feed slot open to an exterior of the outer housing.

18. The shredding machine of claim 1, further comprising an auto-feed bin configured to receive a stack of sheets to be shredded and automatically feed the sheets to the shredding engine.

19. A method of operating a shredding machine, the method comprising:

supporting a collection bin within an interior space of an outer housing such that an open top end of the collection bin is situated underneath a plurality of interleaved cutters of a shredding engine of the shredding machine to receive shredded material therefrom;

displaying the collection bin through a transparent window of a closed door that selectively opens to allow access to the interior space and the collection bin;

operating the shredding engine by energizing a motor to drive the plurality of interleaved cutters;

supplying material to be shredded to the plurality of interleaved cutters through a material passage;

converting the material to be shredded into the shredded material by the operation of the shredding engine;

rotating the collection bin about a central vertical axis during the operation of the shredding engine to evenly disburse the shredded material across a cross-sectional area of the collection bin; and illuminating the shredded material as it falls into the collection bin with a lighting element inside the outer housing during the operation of the shredding engine.

20. The method of claim 19, further comprising refracting light from the lighting element with the material of the collection bin.

* * * * *